United States Patent [19]

Kimoto

[11] Patent Number: 4,782,397
[45] Date of Patent: Nov. 1, 1988

[54] IMAGE DATA PROCESSING APPARATUS WITH EDITING FUNCTION

[75] Inventor: Katsumi Kimoto, Yokohama, Japan

[73] Assignee: Kabushiki Kaisha Toshiba, Kawasaki, Japan

[21] Appl. No.: 55,368

[22] Filed: May 29, 1987

[30] Foreign Application Priority Data

May 30, 1986 [JP] Japan ................................ 61-124911

[51] Int. Cl.⁴ ............................................. H04N 1/40
[52] U.S. Cl. .................................... 358/256; 358/102; 358/183; 358/280
[58] Field of Search .............. 358/256, 257, 280, 102, 358/183; 340/707; 364/521

[56] References Cited

U.S. PATENT DOCUMENTS

| | | | |
|---|---|---|---|
| 4,243,972 | 1/1981 | Toussaint | 340/707 |
| 4,653,020 | 3/1987 | Cheselka | 364/521 |
| 4,656,603 | 4/1987 | Dunn | 364/521 |
| 4,672,459 | 6/1987 | Kudo | 370/61 |
| 4,706,205 | 11/1987 | Akai | 364/521 |

FOREIGN PATENT DOCUMENTS 3411939 11/1987 Fed. Rep. of Germany .
61-15280 1/1986 Japan .

Primary Examiner—Howard W. Britton
Attorney, Agent, or Firm—Cushman, Darby & Cushman

[57] ABSTRACT

An apparatus is disclosed which processes image data. This apparatus comprises an input section which receives image data to be processed, and a memory section which has at least a first memory and a second memory. An input control unit receives the image data input by the input section, to allow it to be stored in the first memory. A display controller reads out the image data stored in the first memory, to display it on a display unit. A indicating unit allows all of the image data displayed on the display unit to be indicated as one unit to be registered for editing. A registration controller allows all of the image data to be stored, as one unit to be registered for editing, in the second memory, indicated in accordance with an indication made by the indicating unit.

21 Claims, 3 Drawing Sheets

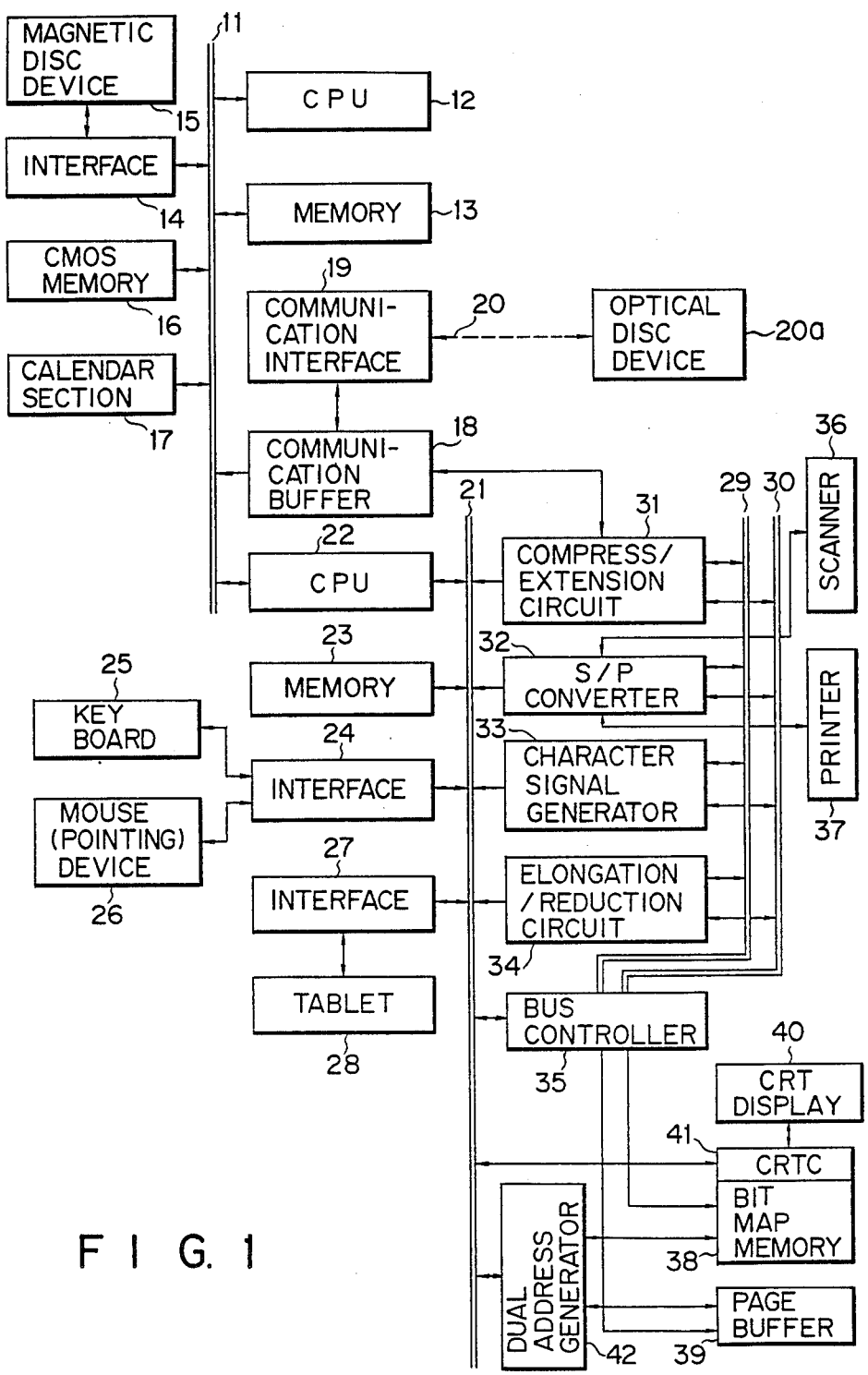
F I G. 1

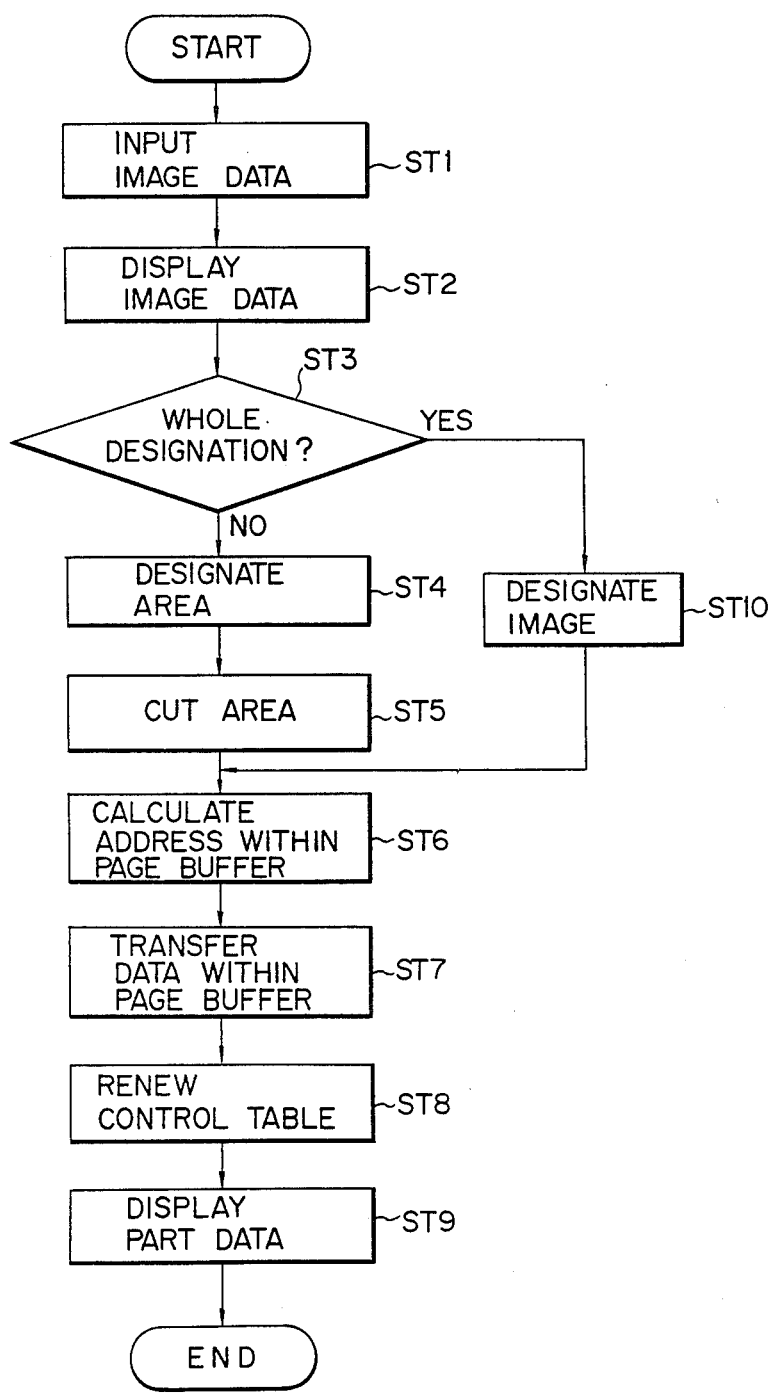

IMAGE DATA PROCESSING APPARATUS WITH EDITING FUNCTION

BACKGROUND OF THE INVENTION

This invention relates to an image data processing apparatus with an editing function and, in particular, to an apparatus for registering the image data, through a simplified operation, for editing.

An image data processing apparatus has been developed which stores image data input through a communication line, or image data obtained by a scanner for converting the image of a document to an electric signal, and displays it on a display unit, through a readout operation, so that it may be edited.

In this type of image data processing apparatus, the image data required for an editing operation is extracted from the displayed image data and is registered as image data called "parts". In the registration of such "parts" image data, the input image data, as well as a plurality of icons representing the editing function, is displayed on the display unit. Among the display icons, there is an area-designating icon which is directed by a pointing device, such as a mouse, in order to designate required portion of the displayed image data. If, among the displayed icons, the icon for "area cut" is designated, the corresponding image data is subjected to an area cut, and is stored in a memory called "a parts box".

The registered image data is read out as required, and is displayed on the display unit. The displayed image may be inserted into another image, if required.

Even if, in the conventional apparatus, all of the image data is registered as "parts", the area-designation and area cut still have to be performed with the input image displayed on the display unit, thus involving a complex operation.

SUMMARY OF THE INVENTION

It is accordingly the object of this invention to provide a new and improved image data processing apparatus with an editing function, which can register all of the displayed image data, as image data for editing, through a simple operation.

According to the present invention, an image data processing apparatus is provided, comprising:
first memory means, for temporarily storing image data;
means for displaying the image data stored in the first memory means;
indicating means for allowing all of the image data which is displayed on the displaying means, to be indicated as one unit to be registered for editing; and
second memory means, for temporarily storing all of the iamge data, in accordance with an indication made by the indicating means.

BRIEF DESCRIPTION OF THE DRAWINGS

These and other objects and features of the present invention can be understood through the following embodiment, with reference to the accompanying drawings in which:

FIG. 1 is a schematic diagram showing an image data processing apparatus according to an embodiment of the present invention;

FIG. 2 is a flowchart for explaining the operation of the embodiment of FIG. 1;

DETAILED DESCRIPTION OF THE PREFERRED EMBODIMENT

Figure 3A:
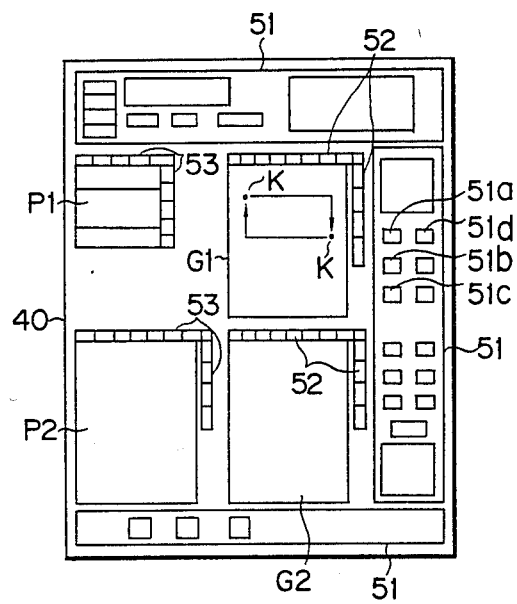
FIGS. 3A and 3B each are a partial, expanded view generally showing one form of a display screen in the embodiment of the present invention.

The image data processing apparatus according to the embodiment of the present invention will now be explained below.

In the image data processing apparatus shown in FIG. 1, CPU 12 is connected, as a control means, to multibus 11, so as to control the apparatus as a whole. CPU 12 is operated by a program which is stored in memory 13. Magnetic disc device 15, CMOS memory 16, calendar section 17, and communication buffer 18 are connected to multibus 11, and the magnetic disc device is connected through interface 14 to multibus 11.

Magnetic disc device 15 stores programs necessary for the operation of CPU 12, as well as data for retrieving the image data and various kinds of data bases.

CMOS memory 16 is backed up by a battery, not shown, and stores the current operation states and so on. In the event of a power supply cutoff, memory 16 can thus maintain the current operation data.

Calendar section 17 stores the date data, and circuit line 20 of a LAN (Local Area Network) is connected via communication interface 19 to communication buffer 18, in which case the communication interface can be connected via circuit line 20 to optical disc device 20a at the central office. Communication buffer 18 is used to temporarily store image data, for example, the image data read out of optical disc device 20a at the central office.

CPU 22 (a control unit), on the other hand, is connected between multibus 11 and local bus 21, to perform the image data processing. CPU 22 is operated by a program which is stored in memory 23 connected to local bus 21.

Keyboard 25 is connected via interface 24 to local bus 21, so as to input various kinds of commands as well as the data for retrieving the image data. Mouse 26 is connected as a pointing device to local bus 21 via interface 24. Tablet 28 is connected via interface 27 to local bus 21.

Between local bus 21, on one hand, and first and second image buses 29 and 30, on the other hand, are connected compression/extension circuit 31, S/P (serial/parallel) converter 32, character signal generator 33, elongation/reduction circuit 34, and bus controller 35.

Compression/extension circuit 31 performs the bandwidth compression and expansion of the image data which are stored, for example, in communication buffer 18.

S/P converter 32 converts the serial image data to parallel image data, and includes scanner (a two-dimensional scanner) 36, adapted to output an electric signal corresponding to the image of an optically scanned document, and printer 37, adapted to print out the image data.

Character signal generator 33 generates a character signal corresponding to a character code, and enlarging/reduction circuit 34 performs the enlarging/reduction of the image data.

Bus controller 35 controls first and second image buses 29 and 30. Bit map memory 38 and page buffer 39 are connected to bus controller 35. The image data is stored in bit map memory 38 and displayed on CRT display (display unit) 40 under the control of CRTC (CRT controller) 41 which is connected to local bus 21.

Page buffer 39 stores, for example, the image data read by scanner 36 as well as the image data (parts) necessary for the editing of the image. The image data which is stored in page buffer 39 is managed by the data stored in a management table contained in memory 23. Page buffer 39 has a memory capacity corresponding to a plurality of pages; for example, four pages (4MB) of an A-4 sized document. Page buffer 39 and bit map memory 38 are controlled by address signals from dual address generator 42 which is connected to local bus 21.

The operation of this image data processing apparatus will be explained below, in connection with the registering of the input image data as the "parts" image data necessary for the editing process. In this case, CPU 22 performs an operation as shown in FIG. 2.

When scanner 36 is operated with the document set thereon, the image data of the document to be read out is input to the apparatus at step ST1 and then supplied via S/P converter 32 and bus controller 35 to page buffer 39 where it is stored. At step ST2, the image data which is stored in page buffer 39 is fed via bus controller 35 to bit map memory 38 and then via CRTC 41 to CRT display 40, where it is displayed.

FIG. 3A shows, for example, one form of display. In FIG. 3A, a plurality of icons 51 are defined at the surrounding sides of the display to set various functions, and image area $G_1$ and $G_2$ are displayed in the middle of the screen. A maximum of four pages of image data can be displayed simultaneously. A plurality of icons 52 are defined along the two adjacent sides of image areas $G_1$ and $G_2$, and are necessary for the editing of the image data.

Figure 3B:
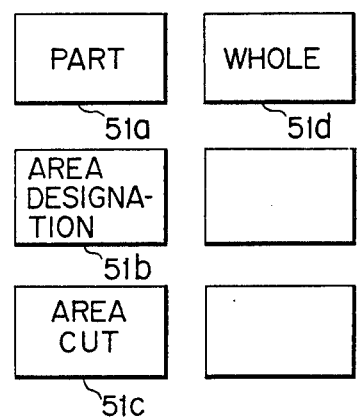
Figure 4:
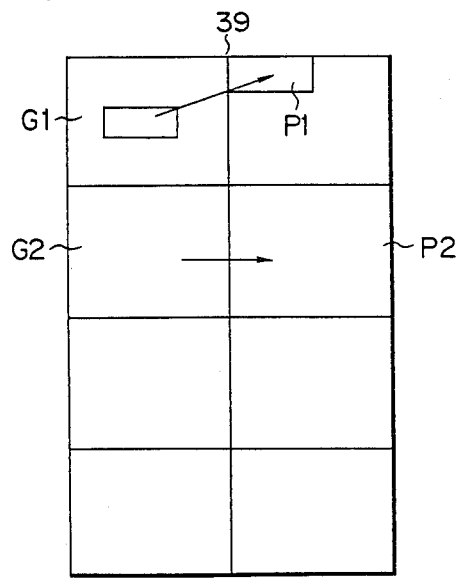
FIG. 4 is a view for explaining the operation of the embodiment of FIG. 1.

In this state of display, it is judged, at step ST3, whether the "parts" image data covers a complete image or a partial image. If, at this time, the icon representing the "parts" image corresponding to the partial image is designated, as is shown enlarged in FIG. 3B, through the use of, for example, mouse 26, the process for the control operation of CPU 22 through CRTC 41 goes to step ST4. If the required image portion of the document (image area) $G_1$ is designated at the location of its diagonal points with the use of cursors K after icon 51b for area designation has been designated, then the corresponding image portion is recognized. When icon 51c for area cut is designated subsequently, then the corresponding area cut is recognized at step ST5. An address in page buffer 39 corresponding to the designated image data, as well as an address at which the corresponding data is stored as "parts" image data $P_1$, is found at step ST5. At step ST7, the designated image data is transferred to an empty area within page buffer 39, as is shown in FIG. 4, through bus controller 35. At step ST8, the management table in memory 23 is updated and it is comprised of, for example, image data memory addresses and data length stored in page buffer 39 which are produced in accordance with the "parts" image data. Then, at step ST9, the "parts" image data $P_1$ to be extracted is read out of page buffer 39 and, as is shown in FIG. 3, is displayed on CRT display unit 40, noting that icons 53 necessary for an editing operation are displayed adjacent to the sides of the "parts" image corresponding to the image data.

At step ST3, icon 51d for the "parts" image corresponding to the whole of the displayed image is designated by mouse 26 and the process goes to step ST10. If, in this state, all of the image data as the "parts" image is designated, for example, with the use of mouse 26, this is recognized in the apparatus, and the process goes to step ST6. At step ST6, the address of the image data $G_2$ stored in page buffer 39 is found, together with the address at which the image data $G_2$ is stored as "parts" image data $P_2$. At step ST7, the image data $G_2$ is transferred within page buffer 39 and used as the "parts" image data $P_2$. The management table of memory 24 is updated at step ST8 and "parts" image data $P_2$ is displayed, at step ST9, on CRT display 40, as is shown in FIG. 3.

In this way, the "parts" image data is read out for the intended object and utilized for the editing of various images, such as cutting and pasting incorporating, partially erasing, add-on character, etc., for example. The edited image data is then stored in the optical disc, and printed out by printer 37.

Although the aforementioned embodiment has been explained by way of inputting the image data by use of scanner 36, the present invention is not restricted thereto. The same operation can also be performed even if, subsequent to a retrieving operation, the image data is input from an optical disc device over communication line 20 at the central office such as LAN, for example.

Although the optical disc device has been explained as being situated at the central office, not with the image data processing apparatus, it may be located with the image data processing apparatus, in which case, subsequent to a retrieving step, the image data can be input to the present apparatus from the optical disc apparatus. In this case, the optical disc device searches the image data stored in the optical disc, and displays it on the display unit. The optical disc device is also capable of editing the image data designated as the "part" and the image data scanned by the scanner.

Furthermore, scanner 36 may be located at the central office, not with the image data processing apparatus.

According to the present invention, if the input image data as a whole is used for the "parts" image, it is not necessary to subject the image data to an area designation and area cut, as in the conventional apparatus. As a result, an easy-to-operate apparatus can be implemented in comparison with the conventional apparatus, thus reducing the processing time which is required for the "parts" image corresponding to the document image.

Even when, from the optical disc apparatus at the central office, for example, connected over the LAN line, necessary image data is retrieved for processing, the occupancy time of LAN becomes shorter, due to the fast processing of the "parts" image data, thus making possible a very advantageous system operation.

The present invention is not restricted to the aforementioned embodiment and can be modified in a variety of ways.

According to the present invention, if the image data as a whole is designated as one "parts" image by the designating means, then the corresponding image data is stored by the control means in the memory means, without the use of an area designation and area cut operation, whereby the whole image can be used as the "parts" image by way of a simpler operation.

I claim:

1. An image data processing apparatus comprising: first memory means, for temporarily storing image data;

means for displaying the image data stored in said first memory means, said displaying means including first and second displaying areas;

first indicating means, for allowing a portion of the image data displayed on said displaying means to be indicated as one unit to be registered for editing;

means for selecting a desired portion of the image data which has been displayed on said displayed means in accordance with an indication made by the first indicating means;

second indicating means, for allowing all of the image data which has been displayed on said display means to be indicated as one unit to be registered for editing;

second memory means, for temporarily storing the corresponding one of the portion and all of the image data, in accordance with an indication made by said first and second indicating means, as one unit to be registered for editing; and processing mean for reading out the corresponding one of the portion and all of the image data stored in said second memory means and supplying those image data to said displaying means, so that said displaying means displays the corresponding one of the portion and all of the image data on the first and second displaying areas, respectively.

2. An image data processing apparatus according to claim 1, wherein said displaying means displays, in accordance with the indication of one of said first and second indicating means, all of the image data stored in said second memory means, as one unit to be registered for editing.

3. An image data processing apparatus according to claim 1, wherein at least one of the corresponding one of the portion and all of the image data is edited on said displaying means.

4. An image data processing apparatus according to claim 1, wherein said displaying means displays, in addition to said image data, indication data for said first and second indicating means.

5. An image data processing apparatus according to claim 4, wherein said indication data includes an icon, and each of said first and second indicating means includes means for picking the icon displayed on said display means.

6. An image data processing apparatus according to claim 1, wherein said image data is processed in a document page unit.

7. An image data processing apparatus according to claim 2, wherein said displaying means displaying said image data corresponding to a plurality of pages.

8. An image data processing apparatus according to claim 6, wherein said second indicating means indicates said all of the image data, corresponding to one page, as one unit to be registered for editing.

9. An image data processing apparatus comprising:
first memory means, for temporarily storing image data;
means for displaying the image data stored in said first memory means;
first indicating means, for allowing a portion of the image data displayed on said displaying means to be indicated as one unit to be registered for editing;
means for selecting a desired portion of the image data which has been displayed on said display means in accordance with an indication made by the first indicating means;
second indicating means, for allowing all of the image data which has been displayed on said display means to be indicated as one unit to be registered for editing; and
second memory means, for temporarily storing the corresponding one of the portion and all of the image data, in accordance with an indication made by said first and second indicating means, as one unit to be registered for editing.

10. An image data processing apparatus according to claim 9, wherein said displaying means displays, in accordance with the indication made by said first and second indicating means, the corresponding one of the portion and all of image data stored in said second memory means.

11. An image data processing apparatus according to claim 9, wherein said image data is processed in a document page unit.

12. An image data processing apparatus according to claim 11, wherein said display means displays the image data corresponding to a plurality of pages.

13. An image data processing apparatus according to claim 9, wherein said display means displays, in addition to the image data, first or second indication data for said first and second indicating means, to be displayed on said display means.

14. An image data processing apparatus according to claim 13, wherein said first and second indication data include icons, and said first and second indicating means include means for picking the icons displayed on said displaying means.

15. An image data processing apparatus comprising:
means for supplying image data;
first memory means, for temporarily storing the image data;
means for displaying the image data stored in said first memory means;
indicating means for allowing all of the image data which is displayed on said displaying means to be indicated as one unit to be registered for editing;
second memory means, for temporarily storing all of the image data, in accordance with an indication made by said indicating means; and
processing means for reading out all of the image data stored in said second memory means and supplying it to said displaying means.

16. An image data processing apparatus according to claim 15, wherein said supplying means includes a two-dimensional scanner.

17. An image data processing apparatus according to claim 15, wherein said image supplying means includes a communication line.

18. An image data processing apparatus according to claim 15, wherein said image data supplying means includes an optical disc device.

19. An image data processing apparatus according to claim 15, wherein said image data is processed in a document page unit.

20. An image data processing apparatus according to claim 15, wherein said displaying means displays, in addition to the image data, indication data for said indicating means.

21. An image data processing apparatus according to claim 20, wherein said indication data includes an icon, and said indicating means includes means for picking the icon displayed on said displaying means

* * * * *